Sept. 29, 1942.   M. C. OVERMAN   2,297,017
TIRE MOLD STRUCTURE
Original Filed May 10, 1939    2 Sheets-Sheet 2
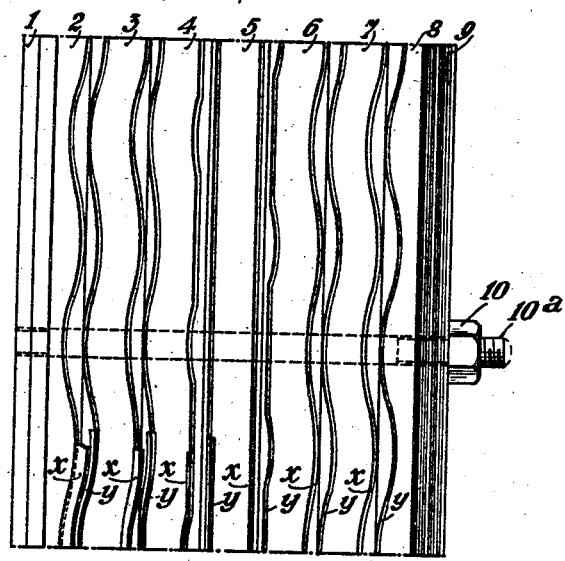
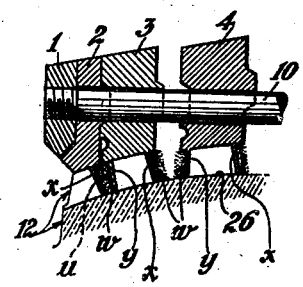
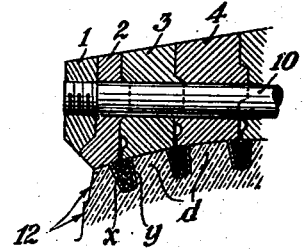
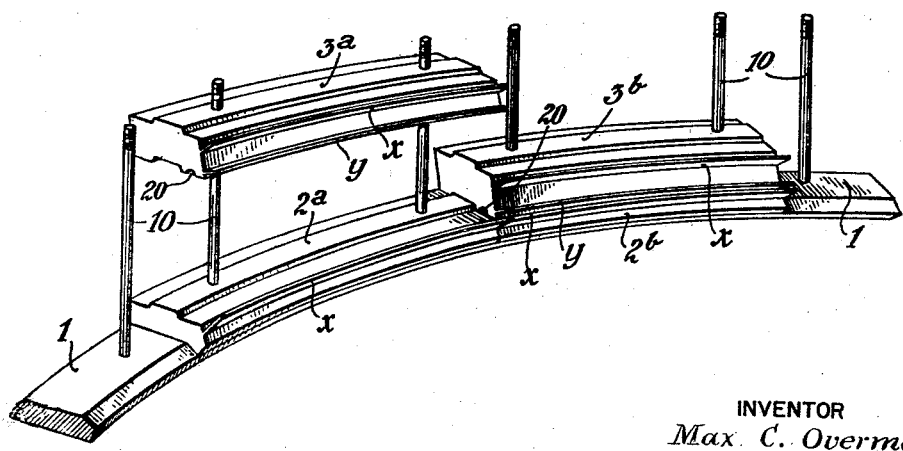
INVENTOR
Max C. Overman
BY
John W. Hoag.
ATTORNEY Patented Sept. 29, 1942

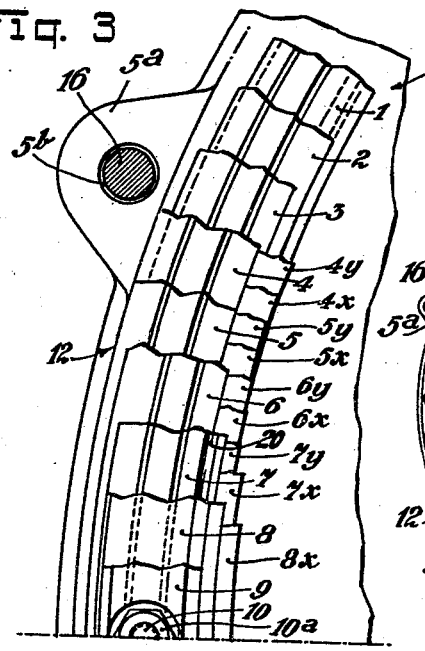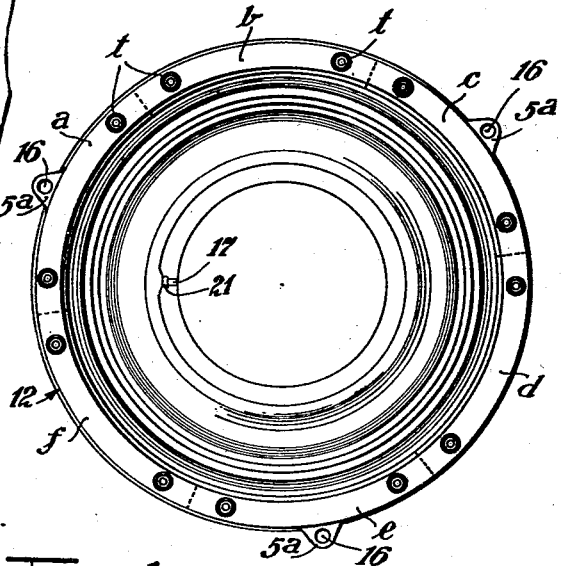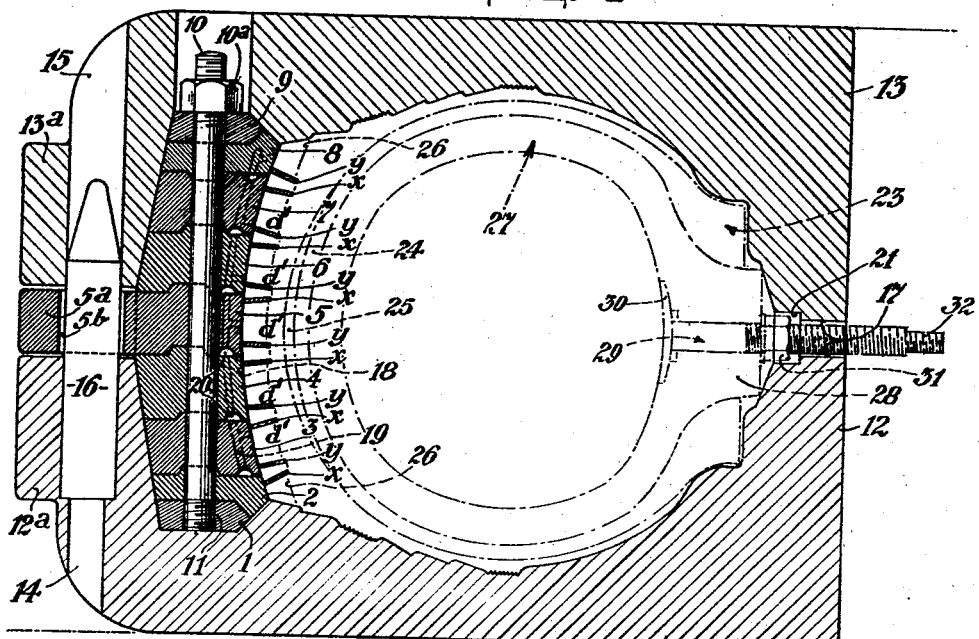

2,297,017

UNITED STATES PATENT OFFICE 2,297,017

TIRE MOLD STRUCTURE

Max C. Overman, New York, N. Y.

Original application May 10, 1939, Serial No. 272,826. Divided and this application December 6, 1939, Serial No. 307,729

5 Claims. (Cl. 18—38)

This invention relates to a tire mold structure and is a division of my co-pending application Serial No. 272,826, filed May 10, 1939, now Patent 2,254,622.

In my co-pending application Serial No. 248,185, I disclose an improved form of tire having circumferentially extending ribs which are alternately draft and undercut in cross section. Besides the advantage of being substantially self-closing this structure lends itself to a pleasing and novel color effect which I have originated and obtained by forming the undercut ribs of white rubber while forming the draft ribs as before of the black composition of the tire tread.

I have found that no tire molds are available for making a tread with alternate draft and undercut ribs and as far as I am aware a mold structure capable of forming my improved rib structure is broadly new.

In carrying out my invention I provide a tread rib mold comprising a number of annular parts, divided into a number of circumferential sections and having inwardly projecting rib spacing members. The annular parts of the tread rib mold assembly are secured together by detachable means such as nuts and bolts which preferably extend between annular support members provided on either side of the assembled annular members. The sections of the latter are detachably secured in the assembly so that each may be released and removed independently of other sections. The assembled tread rib mold may be mounted in a tire mold in position to engage the periphery of the tread of an unvulcanized tire.

Although the rib spacing members illustrated herein are inclined to one another to form alternate draft and undercut rib forming spaces they are distributed between the annular mold parts in such a way that ribs inclined toward one another are not carried by the same annular part. Thus the sections of rib spacing members carried by the sections of the annular tread rib molds parts will not prevent any section of said annular parts from being readily separated from the vulcanized tire.

Since in assembling my rib mold structure some of the rib forming spaces may be readily filled with a special rubber composition, my mold structure lends itself particularly to the formation of a tread structure having ribs some of which are different in composition, in color or otherwise, from the other ribs.

The invention will best be understood if the following description is read in connection with the accompanying drawings, in which:

Figure 1 is a transverse section through the tire mold assembly;

Figure 2 shows the rib mold assembly lying on one side as viewed from above;

Figure 3 is a detail view of a portion of the structure shown in Figure 2 showing how the parts of the tread rib mold are superimposed one upon the other;

Figure 4 is a plan view of the mold surface of the rib mold assembly;

Figure 5 is a detail perspective view showing the sections of the annular tread rib mold members being assembled upon the clamping bolts;

Figure 6 is a detail cross sectional view showing the parts of the rib mold being assembled, and one manner of applying rubber composition to fill the alternate, undercut rib forming spaces;

Figure 7 is a detail view showing how the draft ribs are formed in the spaces between the undercut ribs.

The rib mold consists of the annular support members 1 and 9 and the intermediate annular mold members 2, 3, 4, 5, 6, 7, and 8. Each of the mold members 3, 4, 5, 6, and 7 has projecting inwardly from its inner periphery two rib spacing members, $x$ and $y$, which constitute the side walls of the individual rib forming mold spaces. The rib spacing members carried by each of the mold members 3, 4, 5, 6, and 7 are inclined outwardly from each other thus forming between themselves mold spaces $d$ adapted to shape draft ribs. It will be noted, however, that each rib spacing member of one annular mold member is inclined inwardly toward the nearest rib spacing member carried by the abutting annular mold members thus forming spaces $u$ adapted to shape ribs which are undercut in cross section, i. e., wider at the tread surface than at the base.

Annular mold members 2 and 8 are provided with only one rib spacing member each, $x$ and $y$ respectively. They are inclined toward the nearest rib of the abutting mold members together with which they provide undercut rib forming spaces, completing the alternate arrangement of draft and undercut rib forming spaces.

The support members 1 and 9 are preferably continuous unitary members whereas the mold members 2 to 8 inclusive are divided circumferentially into a number of sections. As illustrated (Fig. 2), they are divided into six sections $a, b, c, d, e, f$. Each section is provided with two transverse bores $t$ to receive a locking bolt and the support member 9 is correspondingly bored at similar distances. The support member 1, as illustrated, is provided with a central bore 11 in its inner face which is internally threaded to receive one end of bolt 10. In assembling the rib mold, bolts 10 may first be seated in bores 11 of the support 1, after which the sections of mold member 2 are positioned by inserting the free ends of bolts 10 in the bores $t$ and lowering the sections of member 2 until they are superimposed upon support member 1, as indicated in Figure 5. The sections of annular mold member 3 are then assembled in the same way and so on until the assembly is complete.

The sections of the mold members may be disassembled from the vulcanized tire in the same manner, by first removing the retaining nuts $10a$ and bolts 10 and then first separating the sections of mold member 8 from the assembly, followed by the sections of mold member 7, and so on. Since no section of any of the mold members carries sections of rib spacing members which are inclined toward one another, each section may be readily separated from the vulcanized tire.

Where it is desired to fill some of the rib forming spaces with a rib forming composition different in color or in other respects from that used for forming the other ribs it will be convenient to fill the rib spaces which are to receive one kind of rib forming composition while the rib mold is being assembled. This may be accomplished by depositing some of the desired composition on the opposing faces of said rib spacing members before they are assembled in abutting relationship. In this way the rib spaces to be preliminarily filled will be filled and the material compacted when the adjoining mold members are moved laterally together, without the difficulty which would be encountered in trying to fill the spaces through their open ends. In the drawings (Fig. 6) I have indicated the spaces $u$ for forming undercut ribs as being preliminarily filled with a special composition $w$, preferably colored white to give a distinctive appearance to the tread of the tire, while the various mold members are being assembled. In Fig. 7 I have shown the spaces $d'$ also filled with the rubber composition from the tread portion of the tire, which is accomplished when the unvulcanized tire is forced against the assembled rib mold surface in a manner well understood by those skilled in this art.

Each of the bolts is provided with a nut $10a$ to tighten the members 1 to 9 together and secure them in position. The complete tread rib mold assembly is inserted within a tire mold comprising two complementary parts 12 and 13 adapted when brought together to form a closure to receive an unvulcanized tire and shape it while it is being vulcanized. At intervals adjacent their peripheries the tire mold members 12 and 13 are provided in their lip portions $12a$ and $13a$ with registering axially extending apertures 14 and 15 to receive dowel pins 16 by which the two tire mold members 12 and 13 may be brought into register and secured together.

As illustrated herein the lip portions $12a$ and $13a$ of tire mold members 12 and 13 are formed so that when the tire mold is closed a space will be left between the lip portions sufficient to receive lugs $5a$ provided at intervals projecting outwardly from the outer periphery of tread rib mold member 5. The lugs $5a$ are bored at $5b$ to receive the dowel pins 16. By positioning lugs $5a$ so that the bores $5b$ are in register with apertures 14 and 15 the mold members 5, and therefore the whole tread rib mold assembly will be centered and held in place by dowel pins 16. The tire mold members 12 and 13 are shaped interiorly to fit snugly around the tread rib mold assembly, which is thus supported adjacent the inner periphery of the tire mold.

The tire mold members 12 and 13 are formed with registering concavities 21 to receive the valve member 29 attached to the air core 27 by the valve head 30 and provided with nut 31 screw threadedly secured on the exterior of the valve member. Valve 29 extends outwardly through the wall of the tire mold and at its free end has a reduced portion 32 for connection with a source of fluid supply, such for example as the compressed air hose of an hydraulic pot vulcanizer.

In the operation of the invention the tread rib mold is first assembled and then placed in one of the members 12 and 13 comprising the tire mold. An unvulcanized tire or carcass 23 which ordinarily comprises the fabric plies 24, the breaker strip 25, and the tread 26, indicated in broken lines in Figure 1, by way of example, is placed on one side within the concavity provided in the tire mold member, with the periphery of tread surface 26 adjacent the mold surface of the tread rib mold. The air core 27 is then inserted within the tire and, after the tread mold has been closed and dowel pins 16 inserted in place, pressure may be applied to the unvulcanized tire 23, as by admitting fluid under pressure into core tube 27, thereby forcing the tread surface of the unvulcanized surface outwardly against the tread rib mold surface causing the rubber composition from the tread portion 26 to flow into the unfilled spaces provided between the rib spacing members $x$ and $y$. In practice, since the tire mold members 12 and 13 will ordinarily be heated to a high degree when the unvulcanized tire 23 is inserted therein, the rubber composition from the tread portion 26 will tend immediately to flow into the unfilled spaces provided by the rib spacing members $x$ and $y$, and this flow of rubber from the tread portion 26 is increased when pressure is applied to expand the tire outwardly, as by admitting fluid pressure into the core tube 27. The step of vulcanizing takes place of course after the rubber flows into the unfilled spaces from the tread portion 26 between spaces $x$ and $y$. In practise, flow of the rubber composition into the rib forming spaces, and the step of vulcanizing, are performed substantially simultaneously since the step of connecting valve member 29 to a source of fluid pressure and the step of vulcanizing are usually both performed in an hydraulic pot vulcanizer.

To insure tight fitting of annular rib mold members 2 to 8 inclusive these may be given a tongue and groove formation illustrated in Figure 1.

To provide a means for escape of excess rubber composition from the tire forming spaces during the time when the unvulcanized tire is being forced against the tread rib mold surface under pressure, rearwardly extending vents 18 are provided in annular rib mold members 3 to 8 communicating with the circumferentially extending groove 19 which at intervals is provided with concavities or catch-basins 20.

It will be understood that the invention is not limited to the details alone described, but that it comprehends broadly a multi-part tread rib mold, and the method of forming the ribs of a tire, as defined in the claims.

What I claim is:

1. Apparatus for forming a tire tread with circumferential ribs, alternately relatively wide load supporting draft ribs and relatively narrow undercut wiper ribs, comprising an annular tire mold having on its inner periphery a number of inwardly projecting rib forming and spacing members positioned to form alternately disposed draft and undercut ribs, said mold being subdivided both radially and circumferentially into juxtaposed sections, circumferential joints between said sections being positioned only between the members forming the undercut ribs.

2. Apparatus for forming a tire tread with circumferential ribs, alternately relatively wide load supporting draft ribs and relatively narrow undercut wiper ribs, comprising an annular tire mold having on its inner periphery a number of circumferentially sectional inwardly projecting rib forming and spacing members, alternately converging and diverging toward the tread surface, only diverging members being separable from one another by means of a circumferential joint intersecting the zone between such diverging members.

3. Apparatus for forming a tire tread with circumferential ribs, alternately relatively wide load supporting draft ribs and relatively narrow undercut wiper ribs, comprising an annular tire mold formed in sections adapted to be closed together and to enclose between them a tread forming matrix and an unvulcanized tire body, said matrix comprising a number of circumferentially sectional annular rings, two outer rings, and between them inner rings, and having a number of inwardly projecting mutually converging rib forming and spacing members, said matrix being divided into sectional rings in a manner such that each two members adapted to form between them a wiper rib are attached to different rings and each of the inner rings is adapted to shape a complete load supporting rib and only part of at least one wiper rib.

4. Apparatus for forming a tire tread with circumferential ribs, alternately relatively wide load supporting draft ribs and relatively narrow undercut wiper ribs, comprising an annular tire mold having on its inner periphery a number of sectional inwardly projecting rib forming and spacing members, adjacent members of said number alternately converging and diverging toward the tread surface, the converging members being permanently connected in a rigid manner, and the diverging members being separable by means of a joint provided therebetween.

5. Apparatus for forming a tire tread with circumferential ribs, alternately relatively wide load supporting draft ribs and relatively narrow undercut wiper ribs, comprising two half-mold members adapted to be secured together, and a tread forming matrix, shaped to form alternate relatively wide load supporting draft ribs and relatively narrower undercut wiper ribs, positioned between said mold members, said matrix consisting of a number of annular sections, said sections each having at intervals transverse bores, registering with similar transverse bores of adjoining sections, and radial vents, leading from the inner periphery of said matrix and communicating with said transverse bores, said vents being positioned only in that portion of the matrix which is shaped to form said load bearing ribs.

MAX C. OVERMAN.